(12) United States Patent
Kice et al.

(10) Patent No.: US 9,574,610 B2
(45) Date of Patent: Feb. 21, 2017

(54) BEARING ASSEMBLY WITH OUTBOARD BEARING SUPPORT CARTRIDGE

(71) Applicant: Kice Industries, Inc., Wichita, KS (US)

(72) Inventors: Timothy F. Kice, Wichita, KS (US); Jeffrey W. Schellenger, Douglass, KS (US); John T. Kattenberg, Olathe, KS (US)

(73) Assignee: KICE INDUSTRIES, INC., Wichita, KS (US)

( * ) Notice: Subject to any disclaimer, the term of this patent is extended or adjusted under 35 U.S.C. 154(b) by 0 days.

(21) Appl. No.: 14/919,137

(22) Filed: Oct. 21, 2015

(65) Prior Publication Data
US 2016/0040721 A1 Feb. 11, 2016

Related U.S. Application Data

(63) Continuation-in-part of application No. 14/049,007, filed on Oct. 8, 2013, now Pat. No. 9,188,162.

(51) Int. Cl.
*F16C 33/76* (2006.01)
*F16C 43/04* (2006.01)
(Continued)

(52) U.S. Cl.
CPC ......... *F16C 33/7896* (2013.01); *F16C 33/80* (2013.01); *F16C 35/045* (2013.01);
(Continued)

(58) Field of Classification Search
CPC ..... F16C 35/045; F16C 35/067; F16C 35/077; Y10T 29/49696; F16J 15/002; F16J 15/16; F16J 15/32; F16J 15/447
See application file for complete search history.

(56) References Cited

U.S. PATENT DOCUMENTS

| 2,014,585 A | 9/1935 | Peineke et al. |
| 2,393,260 A * | 1/1946 | Pardee ............... F16J 15/36 |
| | | 277/374 |

(Continued)

FOREIGN PATENT DOCUMENTS

| EP | 0023953 A1 | 2/1981 |
| EP | 1394429 A2 | 3/2004 |

(Continued)

*Primary Examiner* — Phillip A Johnson
(74) *Attorney, Agent, or Firm* — Husch Blackwell LLP

(57) ABSTRACT

A bearing support assembly adapted for interchangeably supporting a bearing in an inboard configuration and an outboard configuration is provided. The assembly may include a universal end plate to which either of a first bearing support cartridge that is designed for supporting the bearing in the outboard configuration or a second bearing support cartridge that is designed for supporting the bearing in the inboard configuration may be mounted. The first and second bearing support cartridges may include mounting holes that match mounting holes in the end plate thereby permitting the cartridges to be interchangeably mounted to the end plate. This can eliminate the need to replace the end plate when switching between an inboard bearing configuration and an outboard bearing configuration, or vice versa. The bearing support assembly may also include a spacer adapted for axially locating an inner sleeve of a multi-component seal.

21 Claims, 14 Drawing Sheets

(51) Int. Cl.

| | | |
|---|---|---|
| *F16C 33/78* | (2006.01) | |
| *F16C 35/04* | (2006.01) | |
| *F16C 33/80* | (2006.01) | |
| *F16J 15/32* | (2016.01) | |
| *F16J 15/447* | (2006.01) | |
| *F16J 15/54* | (2006.01) | |

(52) U.S. Cl.
CPC ....... *F16J 15/3268* (2013.01); *F16J 15/4472* (2013.01); *F16J 15/54* (2013.01); *F16C 33/7879* (2013.01); *Y10T 29/49643* (2015.01)

(56) References Cited

U.S. PATENT DOCUMENTS

| | | | |
|---|---|---|---|
| 3,295,898 A | | 1/1967 | Finzel |
| 3,482,890 A | | 12/1969 | Burrell |
| 3,758,179 A | * | 9/1973 | Smith .................. F16J 15/348 277/384 |
| 3,890,020 A | | 6/1975 | Thomas |
| 4,094,559 A | | 6/1978 | Slusarski |
| 4,191,385 A | | 3/1980 | Fox et al. |
| 4,344,659 A | | 8/1982 | Shimano |
| 4,438,991 A | | 3/1984 | Lundgren |
| 4,482,194 A | | 11/1984 | Chambers, Sr. |
| 4,688,732 A | | 8/1987 | Jackson |
| 4,928,371 A | | 5/1990 | Colanzi et al. |
| 5,028,054 A | | 7/1991 | Peach |
| 5,814,984 A | | 9/1998 | Ohmi et al. |
| 5,833,372 A | | 11/1998 | Nisley |
| 6,029,538 A | | 2/2000 | Little et al. |
| 6,250,813 B1 | | 6/2001 | Thibault |
| 6,679,634 B2 | | 1/2004 | Plesh, Sr. |
| 6,966,702 B2 | | 11/2005 | Phillips |
| 8,128,095 B2 | | 3/2012 | Surprenant et al. |
| 8,360,651 B1 | | 1/2013 | Fetty et al. |
| 8,632,251 B2 | | 1/2014 | Moratz |
| 2011/0037269 A1 | | 2/2011 | Poon et al. |
| 2011/0216993 A1 | | 9/2011 | Mason et al. |
| 2012/0099811 A1 | | 4/2012 | Ito |
| 2013/0032359 A1 | | 2/2013 | Riggs |

FOREIGN PATENT DOCUMENTS

| | | |
|---|---|---|
| EP | 933545 B1 | 1/2006 |
| EP | 1306618 B1 | 8/2008 |
| EP | 1904771 B1 | 12/2012 |
| WO | 2007071099 A1 | 6/2007 |

* cited by examiner

BEARING ASSEMBLY WITH OUTBOARD BEARING SUPPORT CARTRIDGE

CROSS-REFERENCE TO RELATED APPLICATIONS

This application is a Continuation-in-Part of and claims priority to U.S. patent application Ser. No. 14/049,007 filed on Oct. 8, 2013, to John T. Kattenberg entitled "Bearing Assembly with Spacer for Locating a Seal Sleeve," currently pending, the entire disclosure of which is incorporated herein by reference.

BACKGROUND OF THE INVENTION

Bearing assemblies are well known and are commonly used to support shafts, axles and other rotating components that may be present in various types of industrial equipment, vehicles and other machinery. Such bearing assemblies often include seals to form barriers in order to preclude the entry of external contaminants into the bearings and also to preclude lubricants from escaping from within the bearings. These seals each typically include a flexible seal portion. In some cases, the seals include multiple components, wherein one or more of the components rotate with the shaft and other components remain static.

There are certain difficulties that must be addressed with seals that include both rotating and non-rotating components, as metal-on-metal contact between the components can lead to friction and wear. When this occurs, the seal may become damaged or destroyed resulting in a bearing failure. Unfortunately, the replacement of a damaged seal and/or bearing can be difficult, time-consuming and usually results in an extended period of down time during which the machinery is out of service.

Known equipment, such as material handling equipment (e.g., rotary airlocks for pneumatically conveying particulate material, diverter valves, splitter valves and bucket valves) is be specifically constructed to include either inboard or outboard bearing configurations. Such equipment includes end plates that are specifically adapted for either inboard bearings or outboard bearings. Therefore, end users must decide if they need an inboard or outboard bearing configuration based on anticipated system performance parameters. Once the equipment is installed, if the actual system performance parameters differ from the anticipated performance parameters or if changes in application occur, the end user may have to exchange all or a portion (e.g., end plates) the original equipment for replacement equipment having a different (inboard or outboard) bearing configuration. For example, if an end user selects a rotary airlock with an inboard bearing configuration and then determines that the material passing through the rotary airlock is too abrasive, or a higher conveying pressure is required, or excessive heat is being produced, then the end user must purchase an entirely new end plate or even rotary airlock with an outboard bearing configuration. Such replacement of the end plate or entire rotary airlock adds unnecessary cost and reconfiguration steps.

Thus, a need exists for a bearing assembly in which rotating metallic components are not in contact with non-rotating metallic components of the assembly. A need also exists for a means for axially locating and retaining one or more of the components of a multi-component seal once the seal has been installed into the bearing assembly. A further need exists for an outboard bearing support cartridge adapted for mounting to a common end plate to which an inboard bearing support cartridge may alternatively be mounted. Additionally, a need exists for material handling equipment that includes a common end plate adapted for accepting either an inboard bearing support cartridge or an outboard bearing support cartridge in order to provide end users flexibility to change between inboard and outboard bearing configurations if changes in application or unexpected circumstances occur.

SUMMARY OF THE INVENTION

One embodiment of the present invention involves the provision of a bearing assembly for supporting a rotating shaft. The bearing assembly comprises a support cartridge, a multi-component seal and a spacer. The support cartridge has an axial bore defined therethrough formed by an inner wall. The support cartridge's inner wall can include one or more shoulders defined therein for locating one or more of the bearing, seal and spacer. The multi-component seal can include an outer ring, an inner sleeve and a sealing ring. The outer ring, which remains static when the shaft rotates, may comprise a first inwardly projecting annular lip, a second inwardly projecting annular lip and an annular groove defined between the first lip and the second lip. The inner sleeve, which rotates with the shaft, may include a peripheral flange that is retained in the outer ring's annular groove. The outer ring and inner sleeve may be constructed of stainless steel or other suited metallic materials. The sealing ring, which may be constructed of a flexible material such as an elastomer, extends radially inwardly from the outer ring and is in sealing contact with a collar portion of the inner sleeve. The sealing ring remains static when the shaft rotates.

The spacer is adapted to axially locate the inner sleeve's flange such that it is not in contact with any metallic element of the assembly configured to be static when the shaft is rotating. Particularly, the spacer is configured for locating the inner sleeve's flange in the groove of the outer ring so that the flange does not contact either the first lip or the second lip. The spacer can also serve to locate the inner sleeve to ensure that the sealing ring contacts the outer diameter of inner sleeve collar and not the shaft. The inner sleeve collar can have hardness and surface finish specifications, as defined by the requirements of the sealing ring, that the shaft may not possess.

The present invention is also directed to a bearing support assembly that is adapted for interchangeably supporting a bearing in an inboard configuration and an outboard configuration. This bearing support assembly can include a universal mounting or end plate, a first bearing support cartridge designed for supporting the bearing in the outboard configuration, and a second bearing support cartridge designed for supporting the bearing in the inboard configuration. The end plate may include a plurality of apertures defined therein that are arranged in one or more patterns and are adapted for receiving fasteners, such as bolts. The first bearing support cartridge includes a collar oriented for supporting the bearing in an outboard configuration when mounted to the end plate and a mounting flange with a plurality of apertures defined therethrough for receiving fasteners. One or more slots may be defined through the collar of the first bearing support cartridge to form a ventilated air gap between the bearing and a seal. Heat may be dissipated through these slots. The apertures of the flange are arranged in a pattern that is generally identical to at least one of the patterns of the apertures of the end plate. The second bearing support cartridge includes a collar oriented for supporting the bearing in an inboard configuration when mounted to the end plate and a mounting flange with a plurality of apertures defined therethrough for receiving fasteners. Like with the first bearing support cartridge, the apertures of the flange of the second bearing support assembly are arranged in a pattern that is generally identical to at least one of the patterns of the apertures of the end plate. Accordingly, the first bearing support cartridge and the second bearing support cartridge can be interchangeably swapped and mounted to a common end plate, thereby eliminating the need to replace the end plate when switching between an inboard bearing configuration and an outboard bearing configuration, or vice versa.

A method for manufacturing and assembling the bearing assembly is also provided. In the method, the multi-component seal is slid onto the shaft or placed into the bore of the support cartridge. The spacer is then slid onto the shaft or placed into the bore of the support cartridge. The spacer may be engaged by the inner race of the bearing when the bearing is installed. The spacer in turn engages and locates the inner sleeve of the multi-component seal such that its flange is not in contact with any metallic element configured to be static when said shaft is rotating, including the outer ring's first and second lips. The spacer can also locate the inner sleeve to ensure that the sealing ring contacts the outer diameter of inner sleeve collar and not the shaft.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

DETAILED DESCRIPTION OF THE INVENTION

Figure 1:
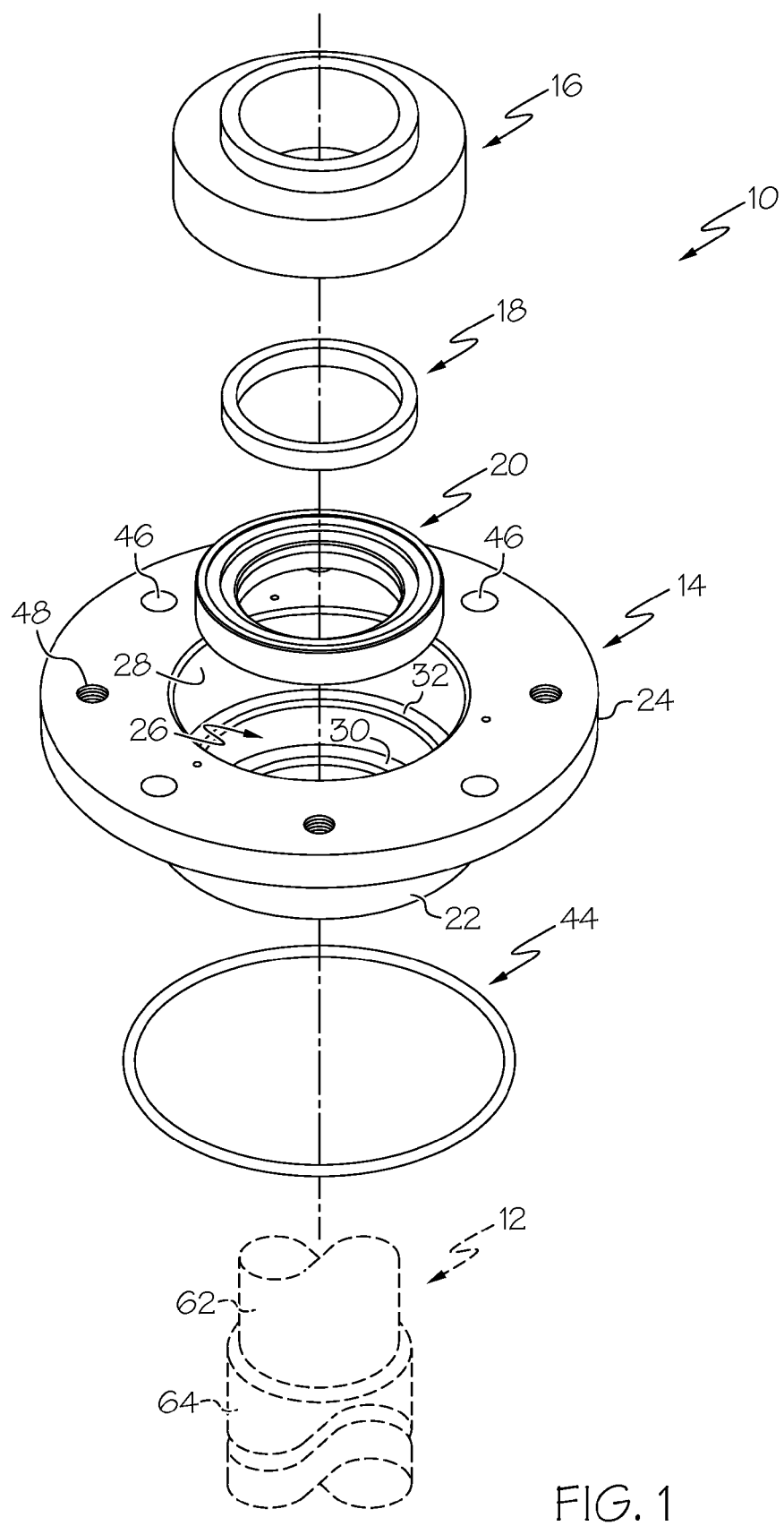
FIG. 1 is an exploded perspective view of a bearing cartridge assembly in accordance with a first embodiment of the present invention.
Figure 2:
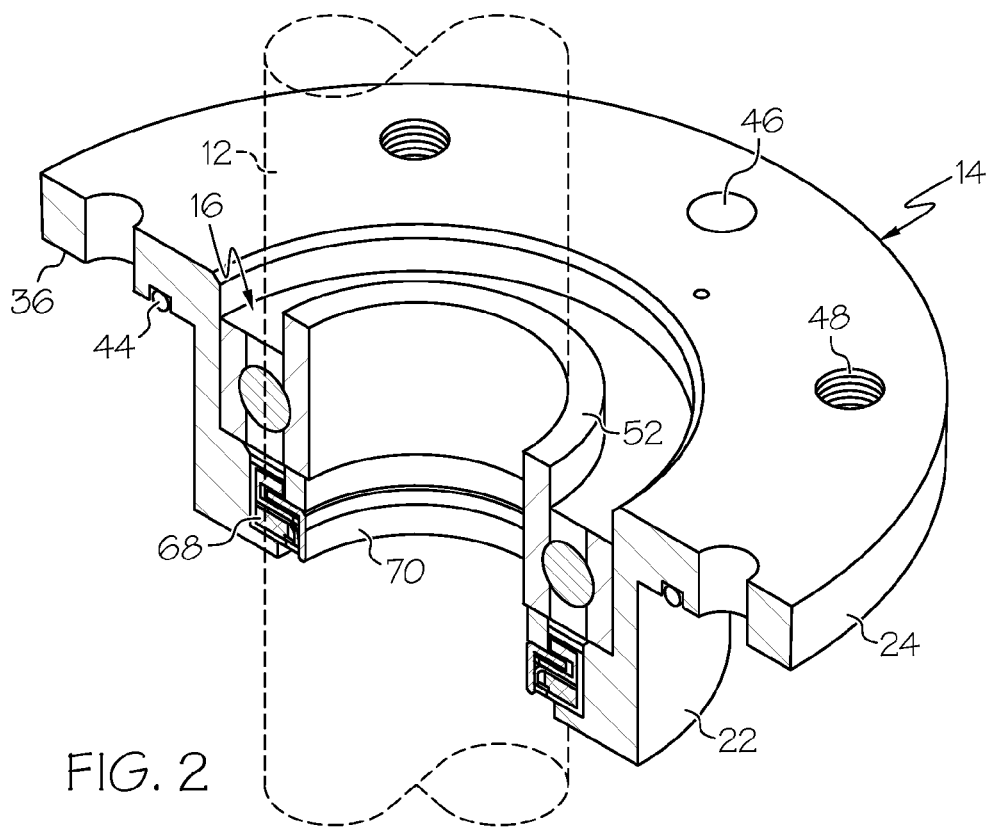
FIG. 2 is a sectional perspective view of the bearing cartridge assembly of FIG. 1.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 3A:
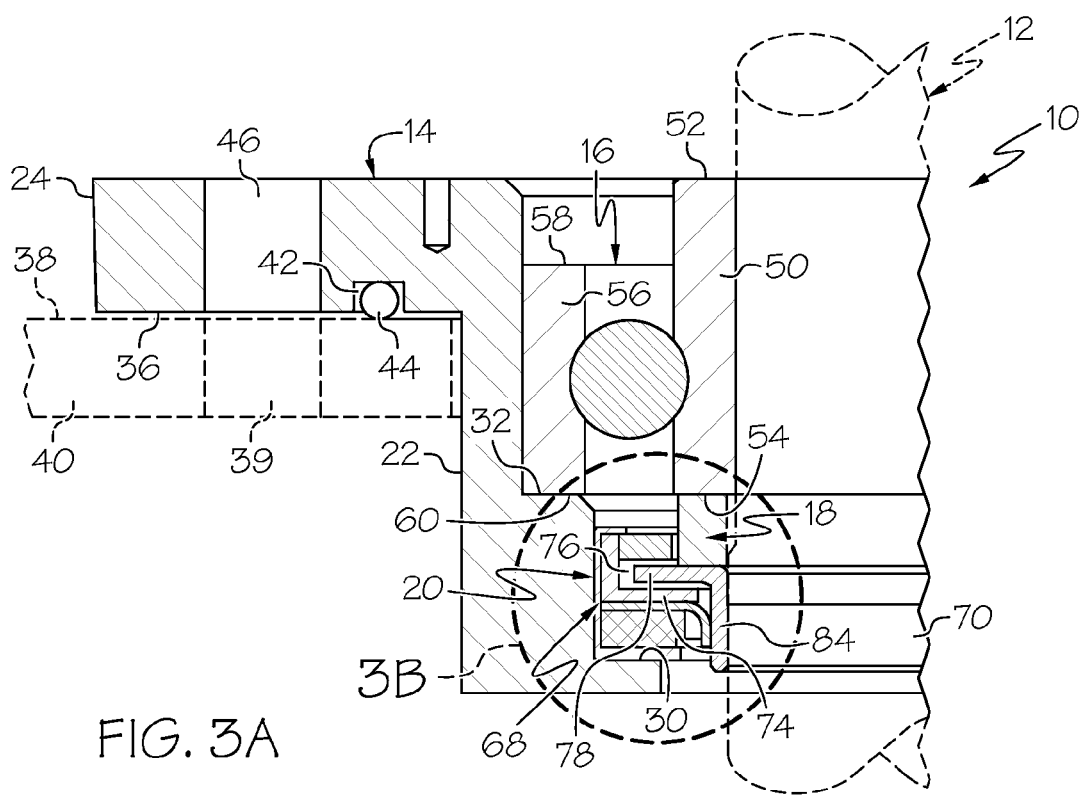
FIG. 3A is a partial sectional side view of the bearing cartridge assembly of FIG. 1.
Figure 3B:
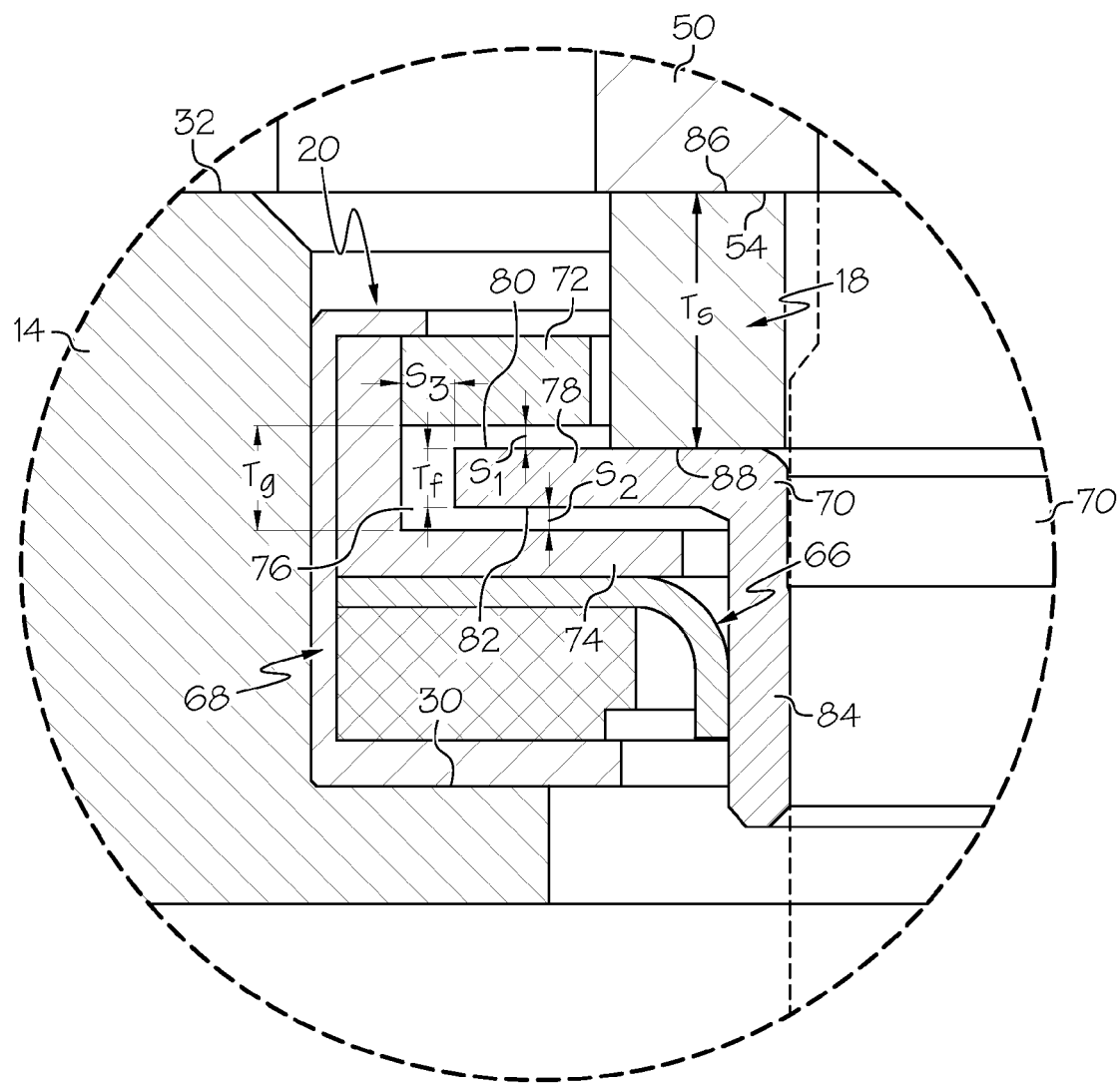
FIG. 3B is an enlarged partial sectional side view of the bearing cartridge assembly of FIG. 1 corresponding to the portion 3B of FIG. 3A.
Figure 4:
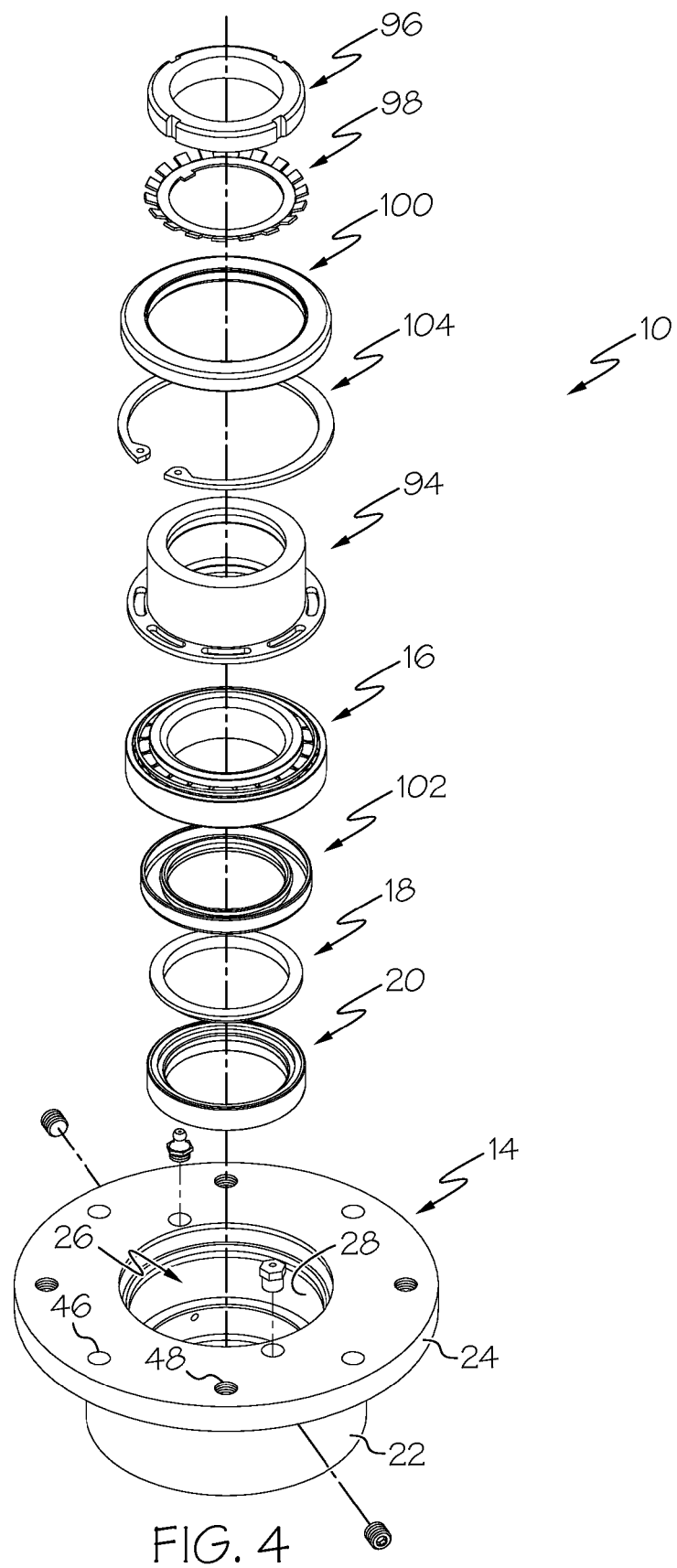
FIG. 4 is an exploded perspective view of a bearing cartridge assembly in accordance with a second embodiment of the present invention.
Figure 5:
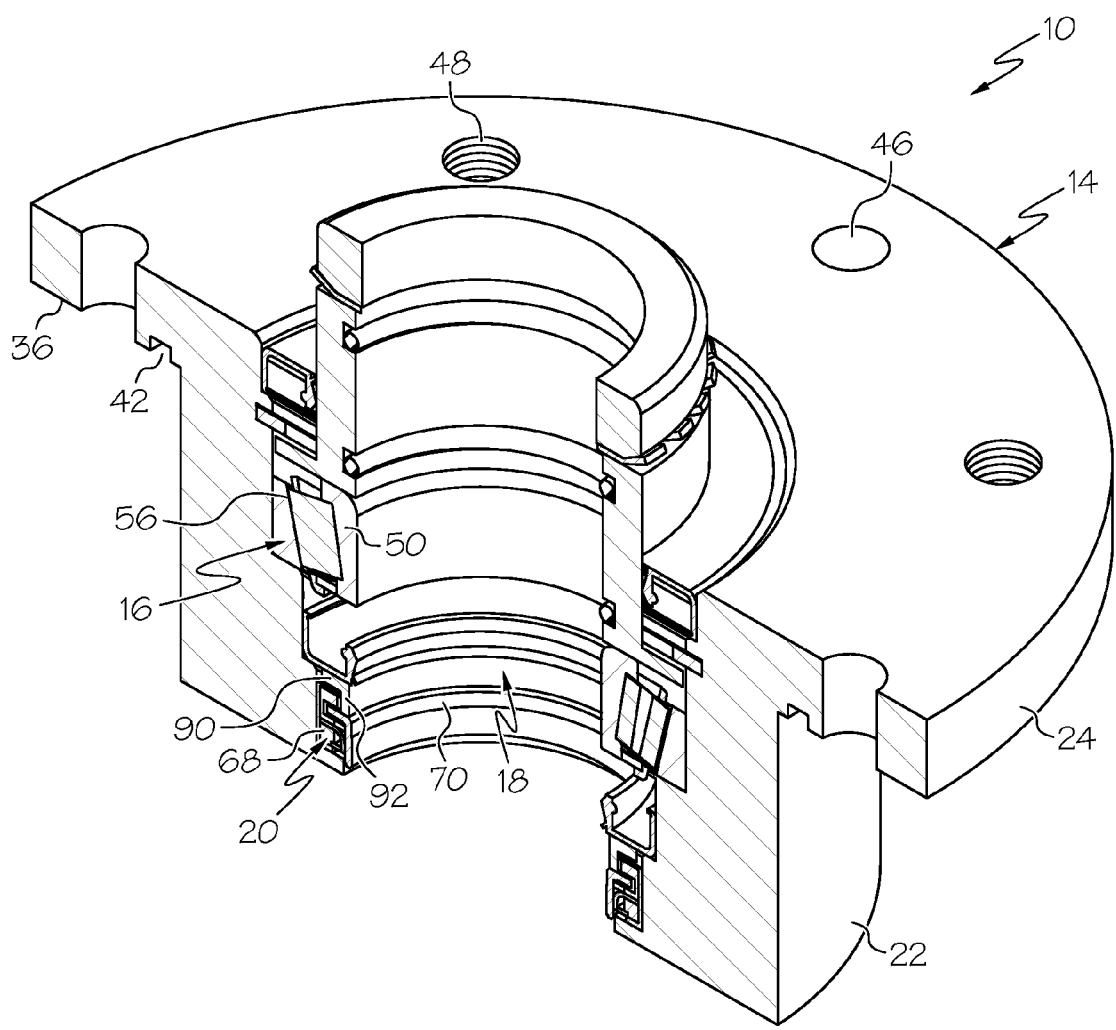
FIG. 5 is a sectional perspective view of the bearing cartridge assembly of FIG. 4.
Figure 6:
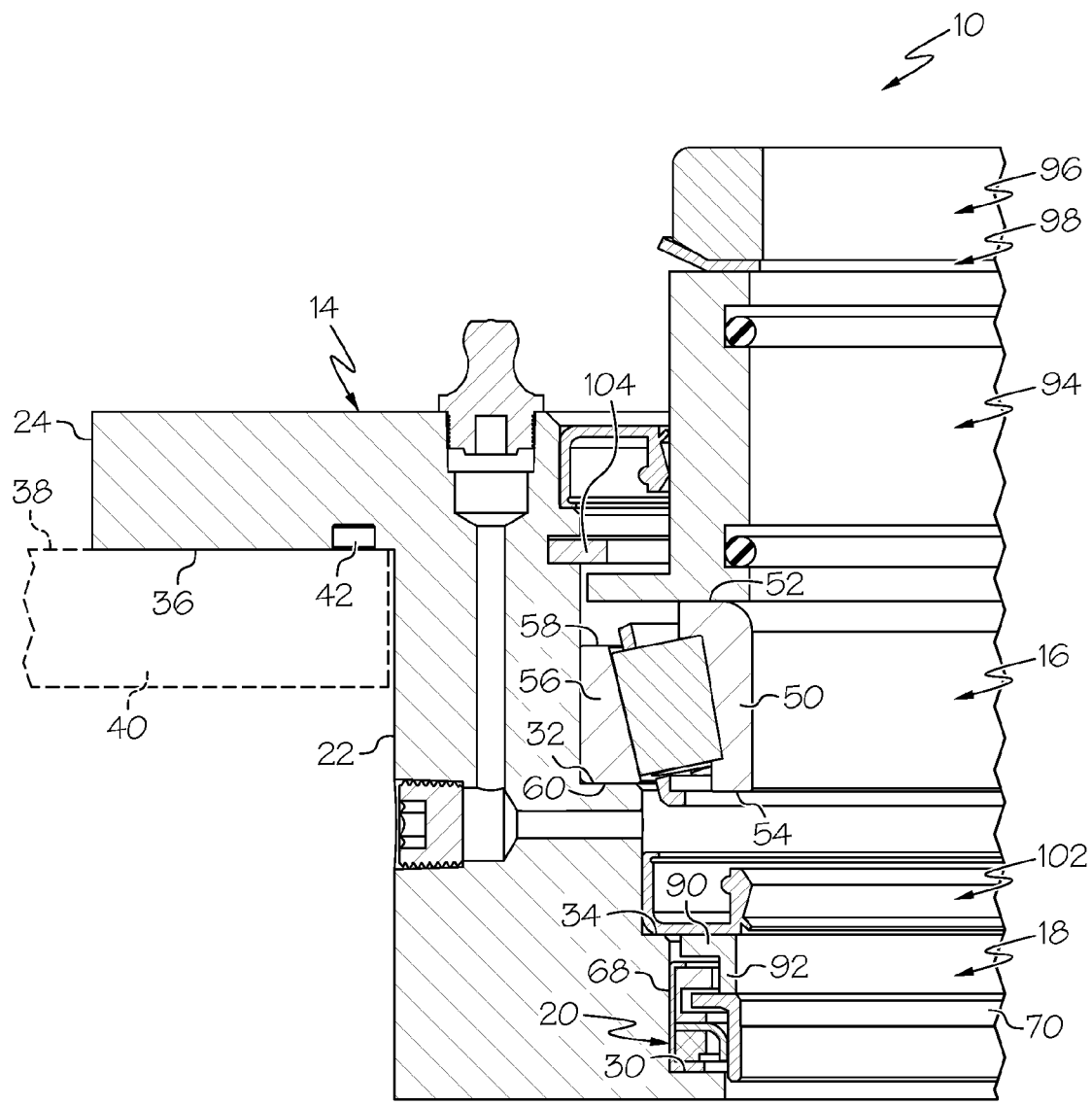
FIG. 6 is a partial sectional side view of the bearing cartridge assembly of FIG. 4.
Figure 7:
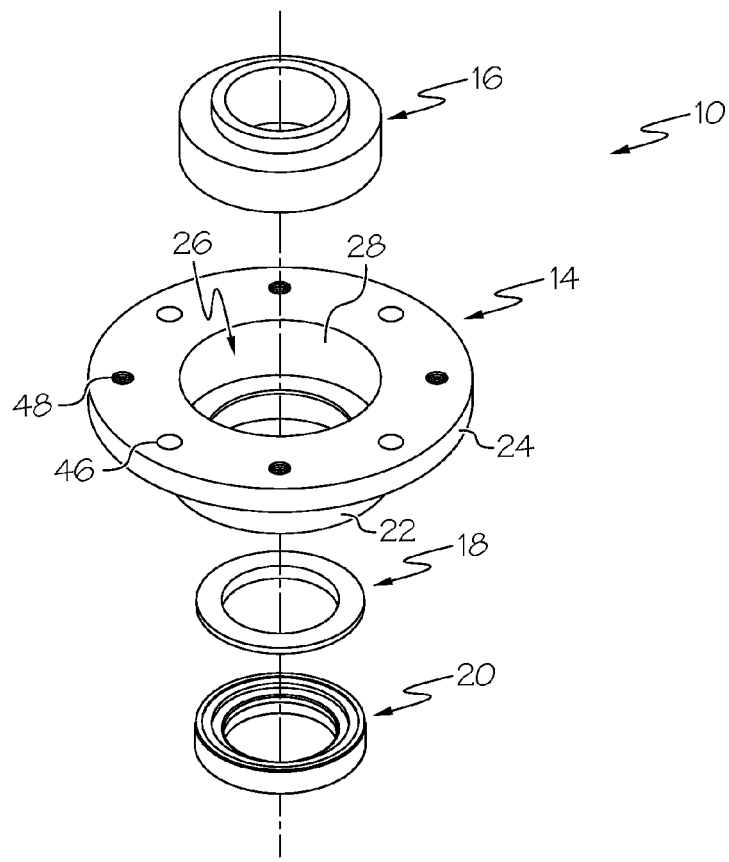
FIG. 7 is an exploded perspective view of a bearing cartridge assembly in accordance with a third embodiment of the present invention.
Figure 8:
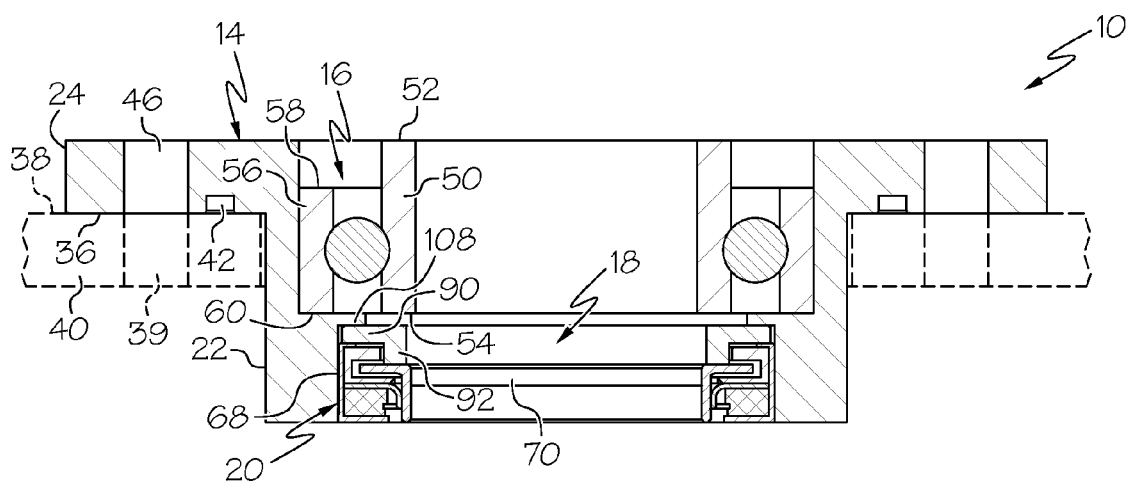
FIG. 8 is a sectional side view of the bearing cartridge assembly of FIG. 7.
Figure 9:
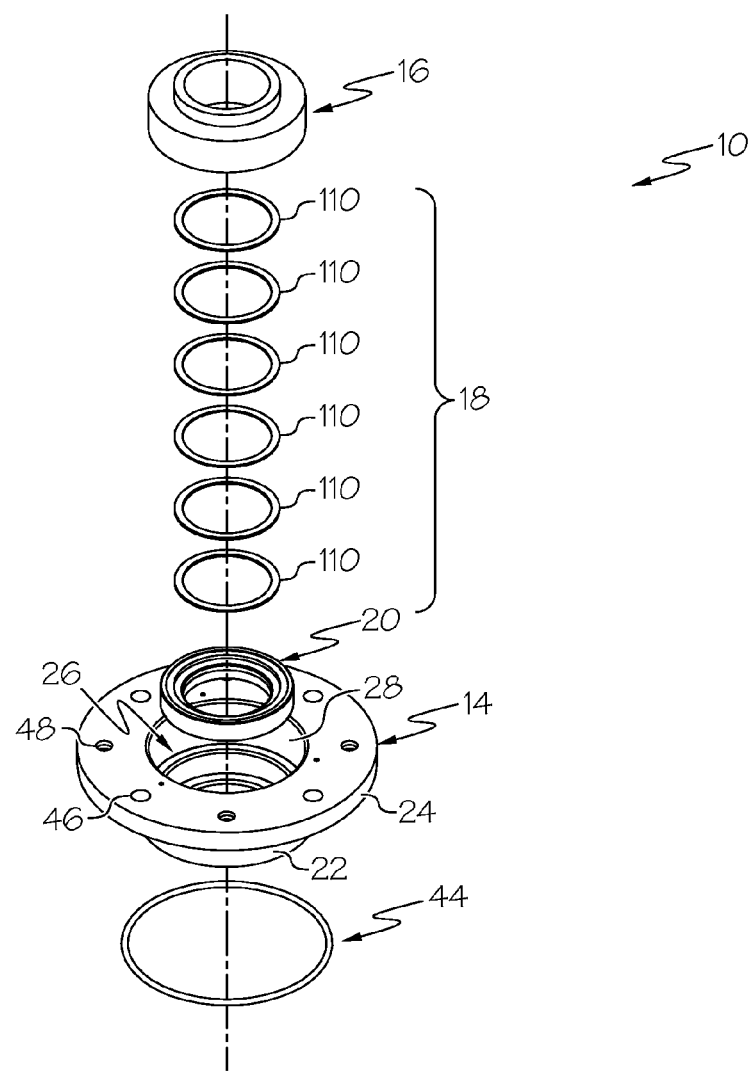
FIG. 9 is an exploded perspective view of a bearing cartridge assembly in accordance with a fourth embodiment of the present invention.
Figure 10:
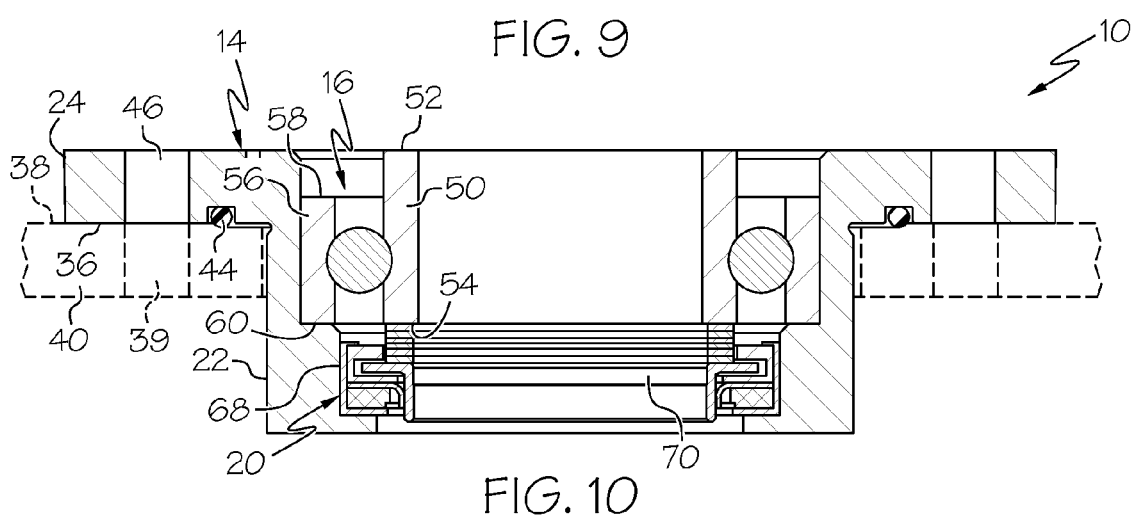
FIG. 10 is a sectional side view of the bearing cartridge assembly of FIG. 9.
Figure 11:
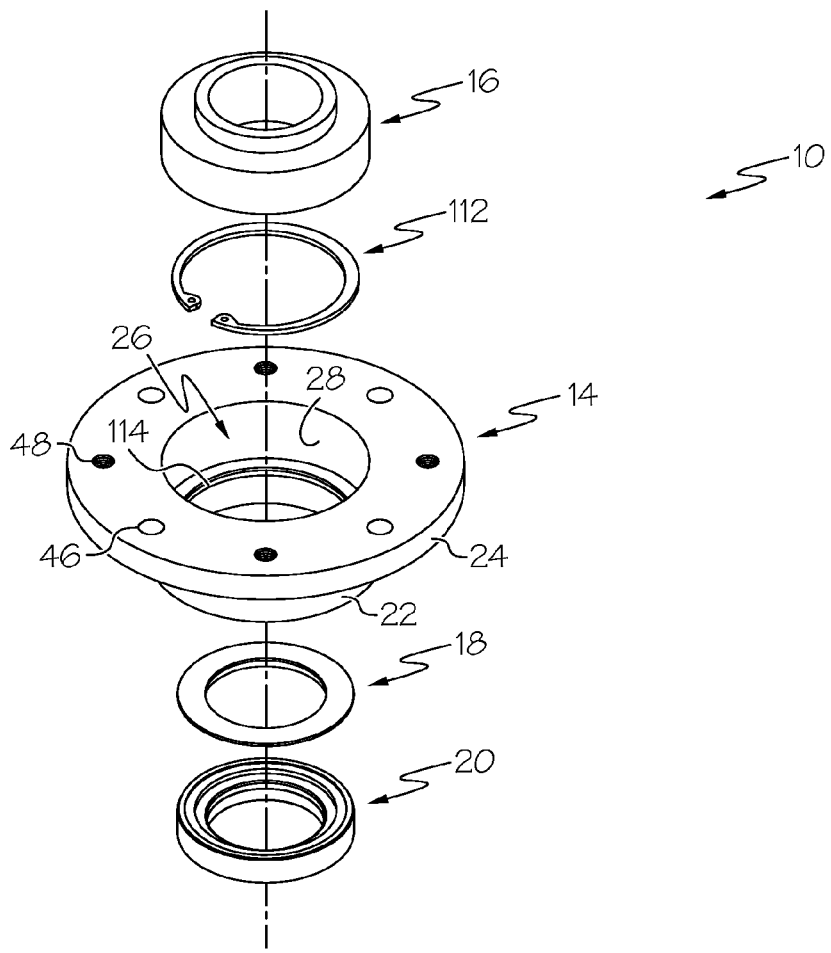
FIG. 11 is an exploded perspective view of a bearing cartridge assembly in accordance with a fifth embodiment of the present invention.
Figure 12:
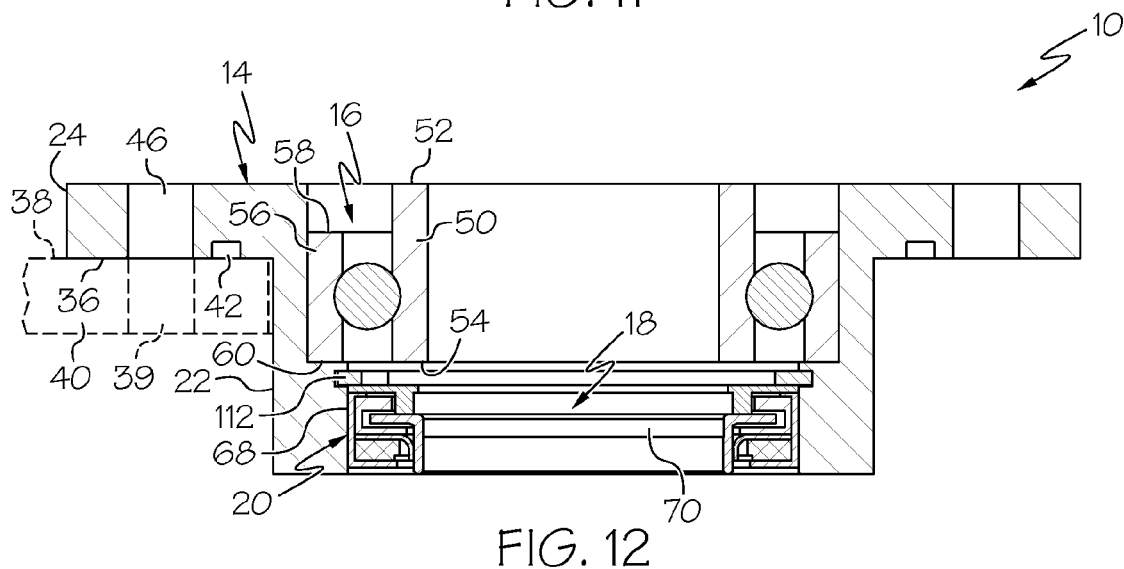
FIG. 12 is a sectional side view of the bearing cartridge assembly of FIG. 11.
Figure 13:
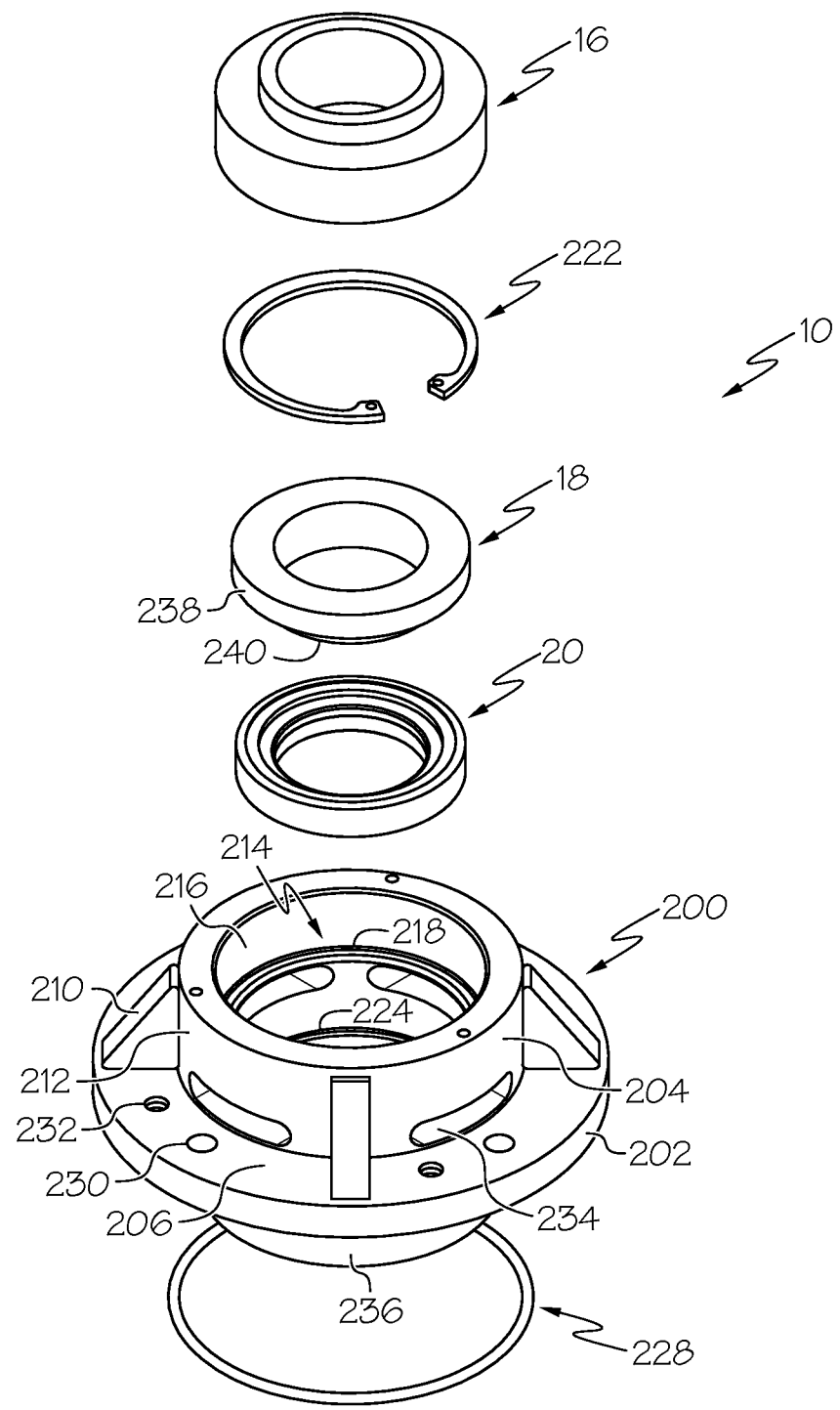
FIG. 13 is an exploded perspective view of a bearing cartridge assembly in accordance with a sixth embodiment of the present invention.
Figure 14:
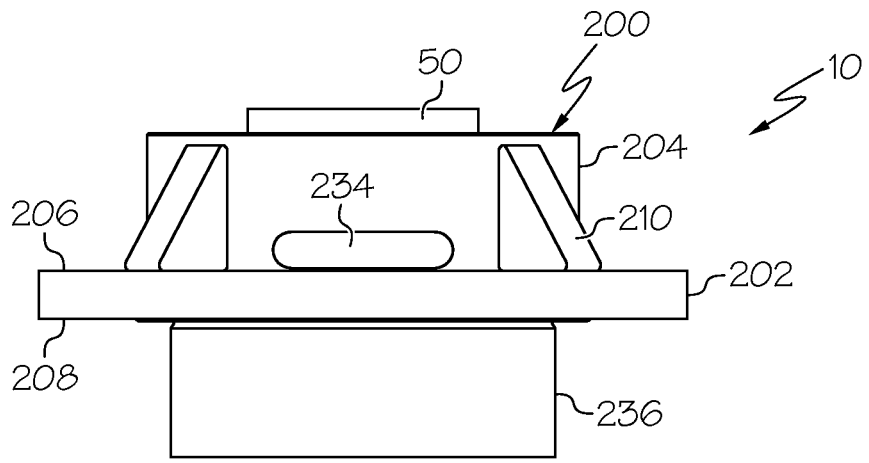
FIG. 14 is a side view of the bearing cartridge assembly of FIG. 13.
Figure 15:
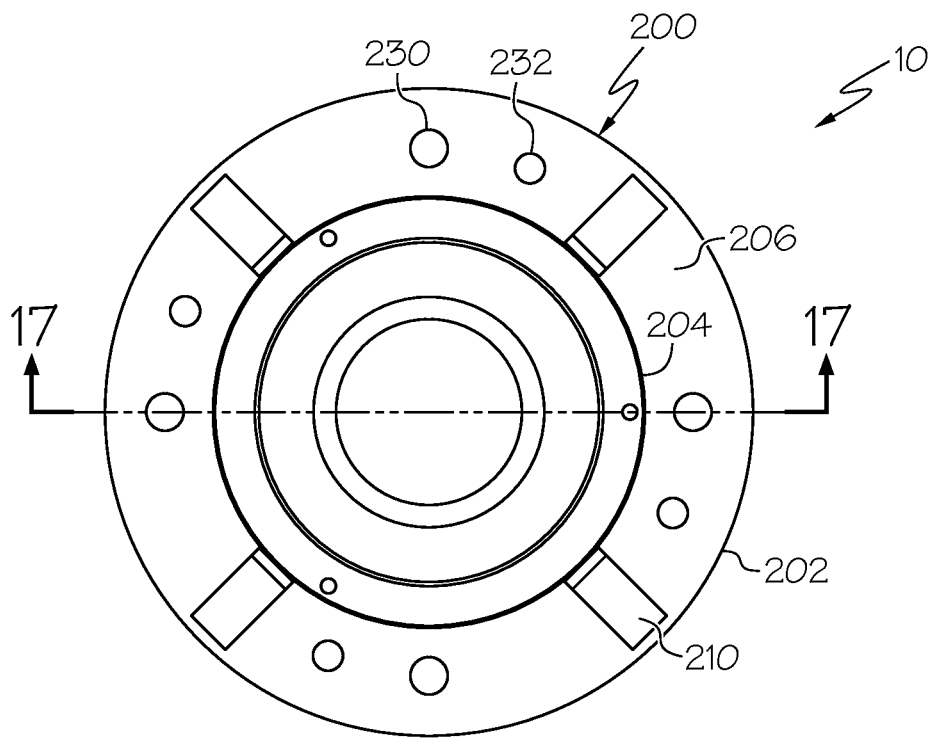
FIG. 15 is a end view of the bearing cartridge assembly of FIG. 13.
Figure 16:
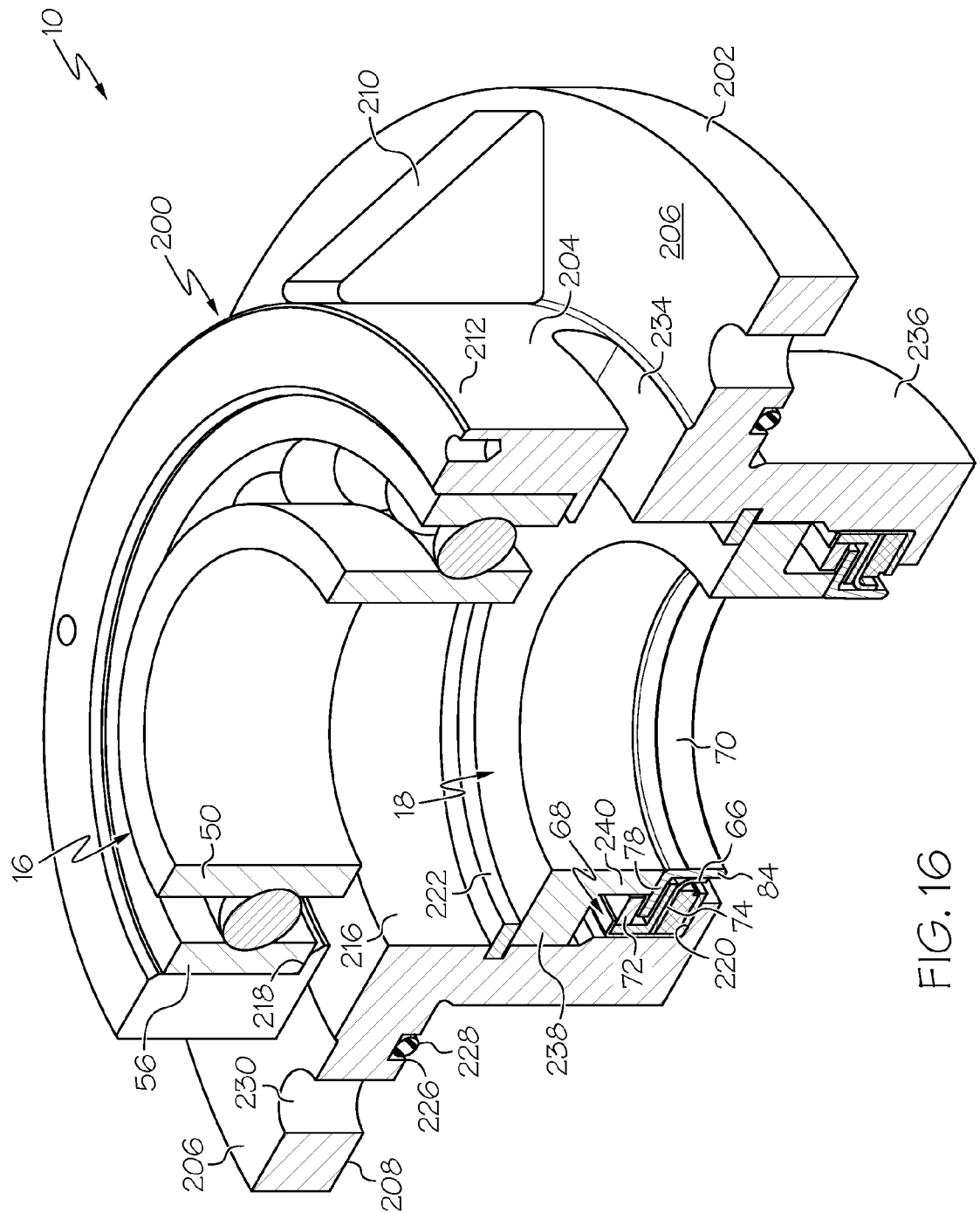
FIG. 16 is a sectional perspective view of the bearing cartridge assembly of FIG. 13.

The present invention is directed generally to a bearing cartridge assembly 10 for supporting an axle or shaft 12. FIGS. 1-3B illustrate a first embodiment of the assembly 10 comprising a support cartridge 14, a bearing 16, a spacer 18 and a multi-component seal 20. Additionally, FIGS. 4-6 illustrate a second embodiment of the assembly 10, FIGS. 7-8 illustrate a third embodiment of the assembly 10, FIGS. 9-10 illustrate a fourth embodiment of the assembly 10, FIGS. 11-12 illustrate a fifth embodiment of the assembly 10, and FIGS. 13-17 illustrate a sixth embodiment of the assembly 10. It will be appreciated that other embodiments, not explicitly shown in the figures, are also within the scope of the present invention. It will also be appreciated that various features and elements of the embodiments may be combined.

The assembly 10 of the present invention is suitable for operation in a variety of applications and environments. In one embodiment, the assembly 10 is designed for use with a rotary airlock, such as one suitable for the pneumatic conveying of particulate materials, as well as diverter valves, splitter valves and bucket valves on material handling equipment. Additionally, it will be understood that the assembly 10 may be used in connection with other equipment, such as automobiles, industrial equipment, construction equipment, agricultural equipment and other machinery. In one embodiment, the assembly 10 is designed for use in a wheel bearing assembly.

The support cartridge 14 may include a hub or collar 22, an annular mounting flange 24 and an axial bore 26 extending through the collar 22 and flange 24. The axial bore 26 is defined by an inner wall 28 of the support cartridge 14. The inner wall 28 of the support cartridge 14 can include one or more stops against which a bearing 16, spacer 18 or multi-component seal 20 may be seated. In one embodiment, the stops are in the form of shoulders 30, 32 and 34 defined in the wall 28 that forms the bore 26. In another embodiment, the stops may be created by snap rings that are received in annular grooves defined in the wall 28.

The mounting flange 24 of the support cartridge 14 can include a mounting face 36 adapted for mating with, for example, the exterior surface 38 of a mounting plate or end plate 40 of a rotary airlock or other suitable piece of equipment. In order to seal the mounting flange 24 to the end plate 40, the mounting face 36 may have a groove 42 defined therein suitable for receiving an O-ring 44. The mounting flange 24 can also include a plurality of apertures 46 defined therethrough designed for receiving a fastener, such as a bolt (not shown), for securing the support cartridge 14 to the end plate 40. These apertures 46 may be unthreaded or threaded. The mounting flange 24 may also have one or more threaded apertures 48. During the process of removing the assembly 10 from the end plate 40, a bolt (not shown) can be screwed into these threaded apertures 48, and against the end plate 40, in order to aid in breaking away a support cartridge 14 that is seized to the end plate 40. When the bolts contact the end plate 40, they push the support cartridge 14 away from the end plate 40. As shown, the apertures 46 and threaded apertures 48 may be arranged in an alternating pattern.

The bearing 16 may be of any suitable type including, for example, a ball bearing, roller bearing, tapered roller bearing, needle bearing or the like. As is well known, the bearing 16 can include an inner race 50, having first and second opposing surfaces 52 and 54, and an outer race 56, having first and second opposing surfaces 58 and 60. The inner diameter of the bearing's inner race 50 is sized such that the bearing 16 fits around a portion 62 of the shaft 12. As shown, when assembled, the second surface 60 of the bearing's outer race 56 may be seated against a shoulder 32 defined in the wall 28. In operation, the bearing's outer race 56 is static and the bearing's inner race 50 rotates with the shaft 12.

The multi-component seal 20 may be any suitable seal now known or hereafter developed. In one embodiment, the multi-component seal 20 comprises an outer ring 68, an inner sleeve 70 and a sealing ring 66. The outer ring 68 may be formed of a plurality of individual components. As illustrated, the outer ring 68 includes a first inwardly projecting annular lip 72, a second inwardly projecting annular lip 74 and an annular groove 76 defined between the first lip 72 and second lip 74. The outer ring's first and second lips 72 and 74 may be constructed of a metallic material, such as stainless steel. The first inwardly projecting annular lip 72 may be in the form of a removable snap ring. The inner sleeve 70, which may also be constructed of a metallic material, includes a peripheral flange 78 having a first surface 80 and a second surface 82. As depicted in FIG. 3B, the thickness $T_f$ of the flange 78 is less than the thickness $T_g$ of the groove 76 such that the flange 78 may be received in the groove 76. As will be discussed in greater detail below, the flange 78 can be located in the groove 76 so that a first space $S_1$ is formed between the flange's first surface 80 and the outer ring's first lip 72 and a second space $S_2$ is formed between the flange's second surface 82 and the outer ring's second lip 74. This prevents the metallic flange 78, which rotates with the shaft 12, from contacting the metallic lips 72 and 74 of the outer ring 68, which is static. Additionally, the outer diameter of the flange 78 is less than the inner diameter of the groove 76 thereby resulting in a radial space $S_3$ therebetween. As shown, the inner sleeve 70 further includes a collar portion 84 having an outer surface that is engaged by the sealing ring 66 which extends radially inwardly from the outer ring 68. The sealing ring 66 may be constructed of a flexible material, such as an elastomer like polytetrafluoroethylene (PTFE) or any other material suitable for creating a seal. As demonstrated, the sealing ring 66 is in sealing contact with an outer surface of the sleeve's collar portion 84.

As illustrated, the first portion 62 of the shaft 12 has a diameter that is less than the diameter of the second portion 64. While the shaft 12 is depicted as having a stepped profile with two different diameters, it will be understood that the shaft 12 need not be stepped and may be of a single, uniform diameter.

As mentioned above, when assembled, the flange 78 of the inner sleeve 70 is not in contact with the outer ring 68. This is achieved through the use of a spacer 18. The inner diameter of the inner sleeve 70 may be approximately equal to the diameter of the second portion 64 of the shaft 12 such that inner sleeve 70 must be pressed onto the shaft 12. As such, when the multi-component seal 20 is slid or pressed onto the shaft 12, the inner sleeve 70 drags along the outer surface of the shaft 12. Because the inner sleeve 70 drags along the outer surface of the shaft 12, the inner sleeve's flange 78 may become pressed against the outer ring's first lip 72. The spacer 18 is provided to axially locate the inner sleeve 70, and particularly the flange 78 of the inner sleeve 70. After the multi-component seal 20 is slid onto the shaft 12, the spacer 18 may be slid onto the shaft 12 to axially locate the flange 78 of the inner sleeve 70.

In the embodiment illustrated in FIGS. 1-3B, the support cartridge 14 has shoulders 30 and 32 defined therein. The multi-component seal 20 is seated against shoulder 30 and the bearing's outer race 56 is seated against shoulder 32. The shoulders 30 and 32 are spaced a distance from one another such that when the bearing's outer race 56 becomes seated against shoulder 32, the spacer 18 has pushed the flange 78 of the inner sleeve 70 so that it is located between, and not in contact with, the first and second lips 72 and 74 of the outer ring 68 of the multi-component seal 20. Put differently, the spacer 18 is of a thickness $T_s$ such that when it is contacted by the bearing's inner race 50, the spacer 18 pushes the flange 78 of the inner sleeve 70 so that it is located between, and not in contact with, the first and second lips 72 and 74 of the outer ring 68 of the multi-component seal 20. As such, once assembled, the flange 78 of the inner sleeve 70 (which rotates with the shaft) is not in contact with the outer ring 68 (which remains static when the shaft turns). This lack of metal-on-metal contact prevents friction and wear thereby increasing the lifespan of the multi-component seal 20. It will also be understood that the spacer 18 may locate the inner sleeve 70 so that the sealing ring 66 is in contact with the outer surface of the inner sleeve's collar 84.

The spacer 18 has first and second opposing surfaces 86 and 88. In the embodiment illustrated in FIGS. 1-3B, the second surface 54 of bearing's inner race 50 engages the first surface 86 of the spacer 18. The second surface 88 of the spacer 18 in turn engages the first surface 80 of the inner sleeve's flange 78 in order to position the flange 78 within the groove 76.

It will be understood that the following components are static when the shaft 12 is rotating: the support cartridge 14, the bearing's outer race 56 and the outer ring 68 of the multi-component seal 20, including the sealing ring 66. Likewise, it will be understood that the following components rotate with the shaft 12 when the shaft 12 is rotating: the bearing's inner race 50, the spacer 18 and the inner sleeve 70 of the multi-component seal 20. In another embodiment, spacers may be provided on either or both sides of the inner sleeve 70 in order to position the flange 78 between the outer ring's first and second lips 72 and 74.

In another embodiment, for example an embodiment designed for use with a wheel hub and bearing assembly, the shaft 12 (which may be an axle shaft) remains static. In this embodiment, it will be understood that the following components may always remain static with the shaft 12: the bearing's inner race 50, the spacer 18 and the inner sleeve 70 of the multi-component seal 20. Likewise, it will be understood that the following components may rotate when the support cartridge 14 (which may be a wheel hub) is rotating: the bearing's outer race 56 and the outer ring 68 of the multi-component seal 20, including the sealing ring 66.

It will be appreciated by one skilled in the art that the seal 20 need not be a multi-component seal. Instead, the seal 20 may be comprised of an unconstrained sleeve that is not restrained by an outer ring, as is the case with a multi-component seal. The spacer 18 may be adapted for engaging the unconstrained sleeve of seal 20 in order to locate the unconstrained sleeve to ensure that the sealing ring 66 contacts the outer surface of the unconstrained sleeve and not the shaft 12.

Turning now to the embodiment of the assembly 10 depicted in FIGS. 4-6, it will be appreciated that this embodiment may be particularly well suited for use in a wheel bearing application. This embodiment includes a support cartridge 14, a bearing 16, a spacer 18 and a multi-component seal 20, as well as a spacing insert 94, a lock nut 96, a lock washer 98 and shaft seals 100 and 102. As shown, the bearing 16 is a tapered roller bearing. As further illustrated, the spacer 18 may comprise a peripheral flange portion 90 and a collar portion 92. Additionally, the spacer 18 may be pushed into place by a seal 102, as opposed to the bearing 16. The seal 102 may be seated against shoulder 34 and remains static. Therefore, the dynamic spacer 18, which may contact the static seal 102, may be constructed of a polymer material, such as PTFE, to prevent metal on metal friction and wear.

In the embodiment shown in FIGS. 7-8, the spacer 18, which can be constructed of a polymer material to prevent metal on metal contact, may be retained in place by an annular protrusion 108 extending inwardly from the inner wall 28 of the support cartridge 14. In the embodiment depicted in FIG. 9-10, the spacer 18 may be comprised of a plurality of shim or washer members 110, which may have a combined thickness selected to correspond to the dimensions of a particular support cartridge 14 and multi-component seal 20. Additionally, in the embodiment shown in FIGS. 11-12, the spacer 18, which can be constructed of a polymer material to prevent metal on metal contact, may be retained in place by a snap ring 112 that is received in an annular groove 114 defined in the inner wall 28 of the support cartridge 14.

A method for manufacturing and assembling a bearing cartridge assembly 10 is also provided. In the method, the multi-component seal 20, such as a multi-component seal having an outer ring 68 and an inner sleeve 70, is slid onto the shaft 12 or placed into the bore 26 of the support cartridge 14. A spacer 18 is then slid onto the shaft 12 or placed into the bore 26 of the support cartridge 14. The spacer 18 may be engaged by the inner race 50 of the bearing 16 when the bearing 16 is installed. The spacer 18 engages and locates the inner sleeve 70 such that its flange 78 is not in contact with any element configured to be static when said shaft 12 is rotating. Specifically, the spacer 18 may locate the flange 78 in between the first and second inwardly projecting annular lips 72 and 74 of the outer ring 68 so that the flange 78 is not in contact with either lip 72 and 74.

Attention will now be turned to FIGS. 13-17, which illustrate an embodiment of the assembly 10 that includes a support cartridge 200 adapted for supporting a bearing 16 in an outboard configuration. It will be understood that, as used herein, an "outboard" configuration describes a configuration wherein the bearing 16 is supported outside of the end plate 40 of a rotary airlock or other suitable piece of equipment (e.g., located on the exterior of the body of a rotary airlock). Conversely, as used herein, an "inboard" configuration describes a configuration wherein the bearing 16 is supported partially or fully inside of the end plate 40 of the rotary airlock or other suitable piece of equipment (e.g., located at least partially in an interior of the body of the rotary airlock).

As shown in FIGS. 13-17, the support cartridge 200 includes a mounting flange 202 that may be similar or generally identical in nature to the mounting flange 24 of the support cartridges 14 shown in FIGS. 1-12 and described above. The support cartridge 200 also includes a hub or collar 204 extending outwardly from the mounting flange 202, i.e., projecting from an outer side 206 of the mounting flange 202 that is opposite the flange's 202 mounting face 208. The collar 204 may optionally be supported by gussets 210 that are welded to and/or machined in conjunction with the mounting flange 202 and collar 204. The reinforcing gussets 210 can extend between the outer side 206 of the flange 202 and the outer side 212 of the collar 204.

An axial bore 214 extends through the collar 204 and flange 202 and is defined by an inner wall 216 of the support cartridge 200. The inner wall 216 of the support cartridge 200 can include one or more stops against which a bearing 16, spacer 18 or multi-component seal 20 may be seated. The stops may be in the form of shoulders 218 and 220 defined in the wall 216 and/or created by snap rings 222 that are received in annular grooves 224 defined in the wall 216.

One or more radial slots 234 can optionally be defined through the collar 204. The slots 234 provide an opening into an air gap defined between the seal 20 and bearing 16 and provide a path for heat dissipation in the event of high temperatures. Without the slots 234, the bearing chamber would be generally closed with no ventilation path. In that manner, the slots 234 essentially create an "outboard" bearing configuration wherein the bearing 16 is not fully enclosed with a sealed area of the support cartridge 200.

Again, the mounting flange 202 of the support cartridge 200 can include a mounting face 208 adapted for mating with, for example, the exterior surface 38 of an end plate 40 of a rotary airlock or other suitable piece of equipment. In order to seal the mounting flange 202 to the end plate 40, the mounting face 208 may have a groove 226 defined therein suitable for receiving an O-ring 228. The mounting flange 202 can also include a plurality of apertures 230 defined therethrough designed for receiving a fastener, such as a bolt (not shown), for securing the support cartridge 200 to the end plate 40. These apertures 230 may be unthreaded or threaded. The mounting flange 202 may also have one or more threaded apertures 232. During the process of removing the assembly 10 from the end plate 40, a bolt (not shown) can be screwed into these threaded apertures 232, and against the end plate 40, in order to aid in breaking away a support cartridge 200 that is seized to the end plate 40. When the bolts contact the end plate 40, they push the support cartridge 200 away from the end plate 40. As shown, the apertures 230 and threaded apertures 232 may be arranged in an alternating pattern.

The support cartridge 200 can further include a second hub or collar 236 extending inwardly from the mounting flange 202, i.e., projecting inwardly from the flange's 202 mounting face 208. As best demonstrated in FIGS. 16-17, the second collar 236 may be adapted for receiving and supporting the multi-component seal 20 and spacer 18.

Figure 17:
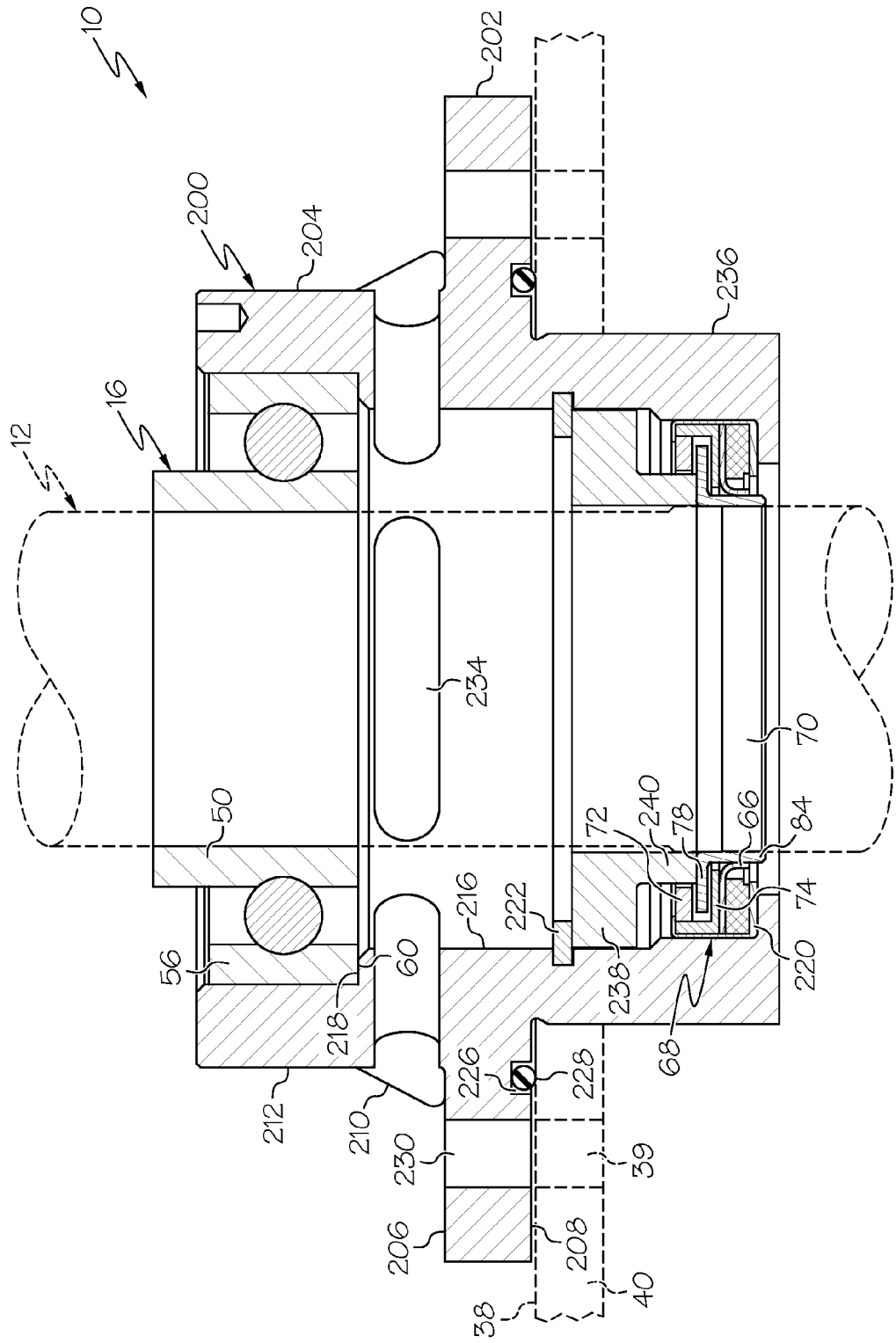
FIG. 17 is a sectional side view of the bearing cartridge assembly of FIG. 13.

When assembled, as best shown in FIG. 17, the second surface 60 of the bearing's outer race 56 may be seated against a shoulder 218 defined in the wall 216. In operation, the bearing's outer race 56 is static and the bearing's inner race 50 rotates with the shaft 12. The multi-component seal 20 is seated against shoulder 220. The spacer 18 is located and held in place by the snap ring 222. The spacer 18 includes a peripheral flange portion 238, which is seated against the snap ring 222, and a collar portion 240, which has a length and is adapted for locating the inner sleeve 70 of the multi-component seal 20. In other words, the spacer 18 pushes the flange 78 of the inner sleeve 70 so that it is located between, and not in contact with, the first and second lips 72 and 74 of the outer ring 68 of the multi-component seal 20. In operation, the flange 78 of the inner sleeve 70 (which rotates with the shaft) is not in contact with the outer ring 68 (which remains static when the shaft turns). This lack of metal-on-metal contact prevents friction and wear thereby increasing the lifespan of the multi-component seal 20. It will also be understood that the spacer 18 may locate the inner sleeve 70 so that the sealing ring 66 is in contact with the outer surface of the inner sleeve's collar 84.

Figure 18:
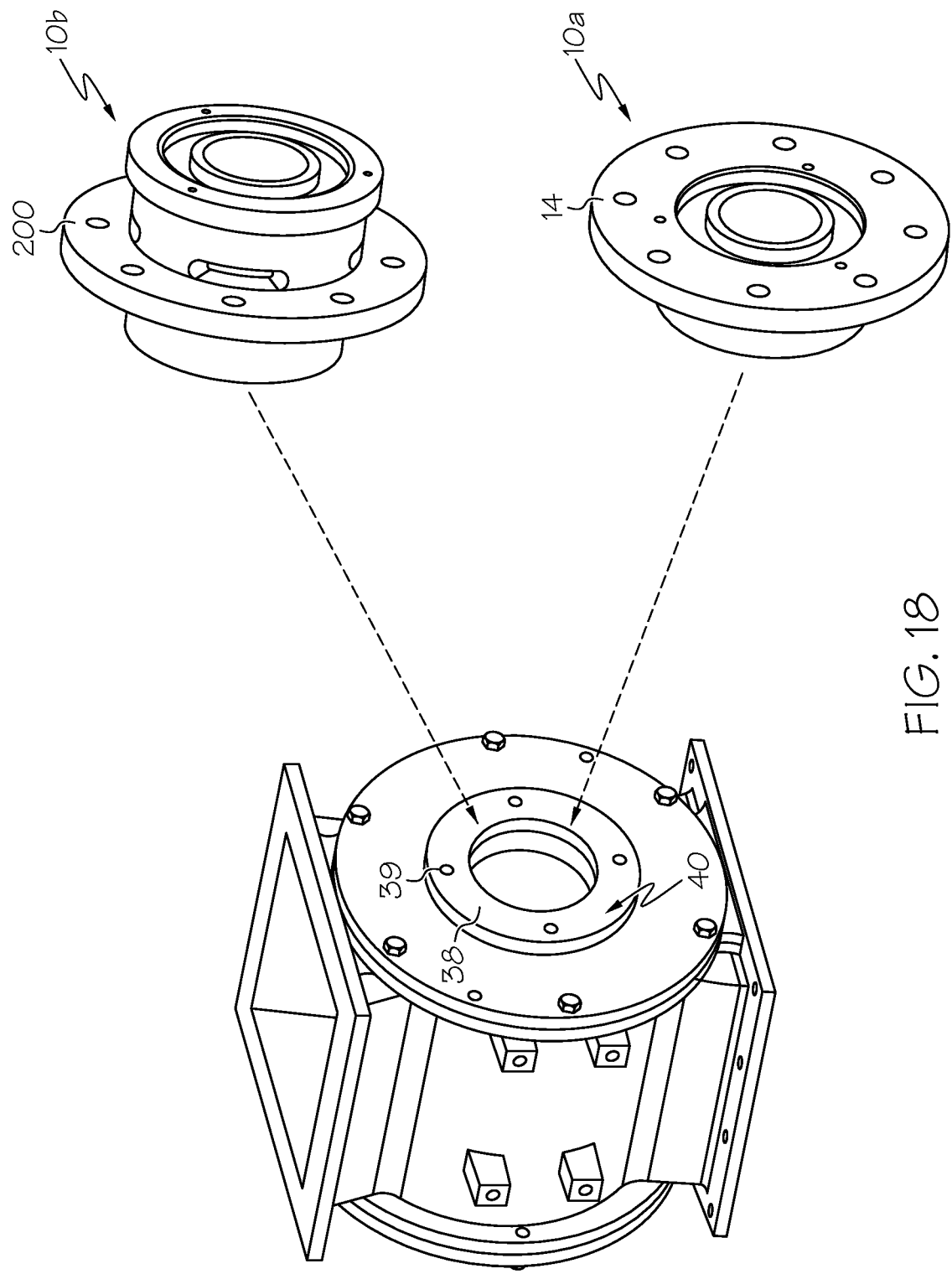
FIG. 18 is a side perspective view of a rotary airlock with an end plate suitable for interchangeably receiving either one of an outboard bearing cartridge assembly or an inboard bearing cartridge assembly.

FIG. 18 illustrates a rotary airlock having an end plate 40 that is adapted for interchangeably receiving either an inboard bearing cartridge assembly 10a or an outboard bearing cartridge assembly 10b. Either an inboard bearing cartridge assembly 10a or an outboard bearing cartridge assembly 10b may be mounted to a universal or common end plate 40. In fact, the flange 24 and hole 46 pattern of the inboard bearing support cartridge 14 may be generally identical to the flange 202 and hole 230 pattern of the outboard bearing support cartridge 200, thereby leading to a universal mounting system amongst the cartridges 14 and 200. In other words, the outboard bearing support cartridge 200 can be interchangeably mounted to the end plate 40 via the same holes 39 used to mount the inboard bearing support cartridge 14.

Accordingly, the inboard bearing cartridge assembly 10a and outboard bearing cartridge assembly 10b can be swapped for one another if actual system performance parameters differ from anticipated performance parameters or if changes in the rotary airlock's application occur. Such exchange of the inboard assembly 10a and outboard assembly 10b does not require a replacement of the end plate 40, or the use of any custom designed end plates. This allows the entire airlock body, including the end plates, to remain common for either bearing configuration.

In previous airlocks, it was common practice to weld or cast gussets on the airlock valve's end plate to support an outboard bearing. This not only created an end plate that was unique only for outboard bearing configurations, as compared to inboard bearing configurations, but also added to the overall weight of the valve. If gussets were welded onto the end plate, then the end plate had to be machined in order to maintain proper tolerances and assembly. Accordingly, the use of a common end plate 40 for both the inboard assembly 10a and the outboard assembly 10b can provide greater ease of manufacturing and lower productions costs, as compared to prior designs wherein a specific end plate was required for an inboard bearing configuration and a different specific end plate was required for an outboard bearing configuration.

From the foregoing, it will be seen that this invention is one well adapted to attain all the ends and objects hereinabove set forth together with other advantages which are obvious and which are inherent to the structure. It will be understood that certain features and sub combinations in addition to those shown and discussed herein are possible. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar teams as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A bearing support assembly adapted for interchangeably supporting a bearing in an inboard configuration and an outboard configuration, said bearing support assembly comprising:
    a mounting plate having a plurality of apertures defined therein for receiving fasteners, said apertures being arranged in one or more patterns;
    a first bearing support cartridge including a collar oriented for supporting said bearing in an outboard configuration when mounted to said mounting plate and also including a mounting flange with a plurality of apertures defined therethrough for receiving fasteners and arranged in one of said patterns; and
    a second bearing support cartridge including a collar oriented for supporting said bearing in an inboard configuration when mounted to said mounting plate and also including a mounting flange with a plurality of apertures defined therethrough for receiving fasteners and arranged in one of said patterns;
    wherein said first bearing support cartridge and said second bearing support cartridge can be interchangeably mounted to said mounting plate.

2. The bearing support assembly of claim 1, wherein at least one slot is defined through said collar of said first bearing support cartridge to form a ventilated air gap between said bearing and a seal.

3. The bearing support assembly of claim 1, wherein said mounting plate is an end plate of a rotary airlock, a diverter valve, a splitter valve, or a bucket valve.

4. The bearing support assembly of claim 3, wherein said first bearing support cartridge supports said bearing in a location entirely outside of a body of said rotary airlock, diverter valve, splitter valve, or bucket valve.

5. The bearing support assembly of claim 1, wherein said first bearing support cartridge is a part of an outboard bearing cartridge assembly comprising:
   a multi-component seal including an outer ring and an inner sleeve, wherein said outer ring has a first inwardly projecting annular lip, a second inwardly projecting annular lip and an annular groove defined between said first lip and said second lip, and wherein said inner sleeve has a peripheral flange retained in said outer ring annular groove; and
   a spacer for axially locating said inner sleeve flange.

6. The bearing support assembly of claim 5, wherein said spacer includes first and second opposing surfaces and said inner sleeve flange includes first and second opposing surfaces, and wherein said spacer second surface engages said inner sleeve flange first surface in order to axially locate said inner sleeve flange between said first lip and said second lip.

7. The bearing support assembly of claim 5, wherein said spacer is comprised of a plurality of shims.

8. The bearing support assembly of claim 1, wherein said mounting flange of said first bearing support cartridge includes at least one threaded aperture defined therethrough and adapted for a receiving bolt for pushing said first bearing support cartridge away from said mounting plate to which it is mounted.

9. A bearing cartridge assembly adapted for supporting a bearing in an outboard configuration, said bearing cartridge assembly comprising:
   a support cartridge having a collar oriented for supporting said bearing in said outboard configuration when mounted to a mounting plate and also including a mounting flange with a plurality of apertures defined therethrough for receiving fasteners and arranged in a pattern generally identical to a pattern of apertures defined in said mounting plate;
   a multi-component seal including an outer ring and an inner sleeve, wherein said outer ring has a first inwardly projecting annular lip, a second inwardly projecting annular lip and an annular groove defined between said first lip and said second lip, and wherein said inner sleeve has a peripheral flange retained in said outer ring annular groove; and
   a spacer for axially locating said inner sleeve flange.

10. The bearing cartridge assembly of claim 9, wherein at least one slot is defined through said collar of said support cartridge to form a ventilated air gap between said bearing and said multi-component seal.

11. The bearing cartridge assembly of claim 9, wherein said spacer axially locates said inner sleeve flange in said groove such that said inner sleeve flange does not contact either of said first lip and said second lip.

12. The bearing cartridge assembly of claim 9, wherein said inner sleeve includes a collar portion and wherein outer ring includes a sealing ring extending radially inwardly therefrom and in contact with an outer surface of said collar portion.

13. The bearing cartridge assembly of claim 12, wherein said spacer axially locates said inner sleeve such that said collar of said inner sleeve contacts said sealing ring.

14. The bearing cartridge assembly of claim 12, wherein said outer ring is configured to be static and wherein said inner sleeve is configured to rotate with a rotating shaft.

15. The bearing cartridge assembly of claim 12 further comprising a bearing having an inner race and an outer race, and wherein said bearing inner race, said spacer and said inner sleeve rotate with a rotating shaft.

16. The bearing cartridge assembly of claim 9, wherein said spacer includes first and second opposing surfaces and said inner sleeve flange includes first and second opposing surfaces, and wherein said spacer second surface engages said inner sleeve flange first surface in order to axially locate said inner sleeve flange between said first lip and said second lip.

17. The bearing cartridge assembly of claim 9, wherein said spacer is comprised of a plurality of shims.

18. The bearing cartridge assembly of claim 9, wherein said support cartridge includes a stop against which said outer ring of said multi-component seal is seated.

19. The bearing cartridge assembly of claim 18, wherein said stop is a shoulder defined in a wall that defines an axial bore extending through said support cartridge.

20. The bearing cartridge assembly of claim 18, wherein said stop is a snap ring received in an annular groove defined in a wall that defines an axial bore extending through said support cartridge.

21. The bearing cartridge assembly of claim 9, wherein said mounting flange of said support cartridge includes a second plurality of threaded apertures defined therethrough and adapted for receiving bolts for pushing said support cartridge away from a structure to which it is mounted.

* * * * *